Figure 1:
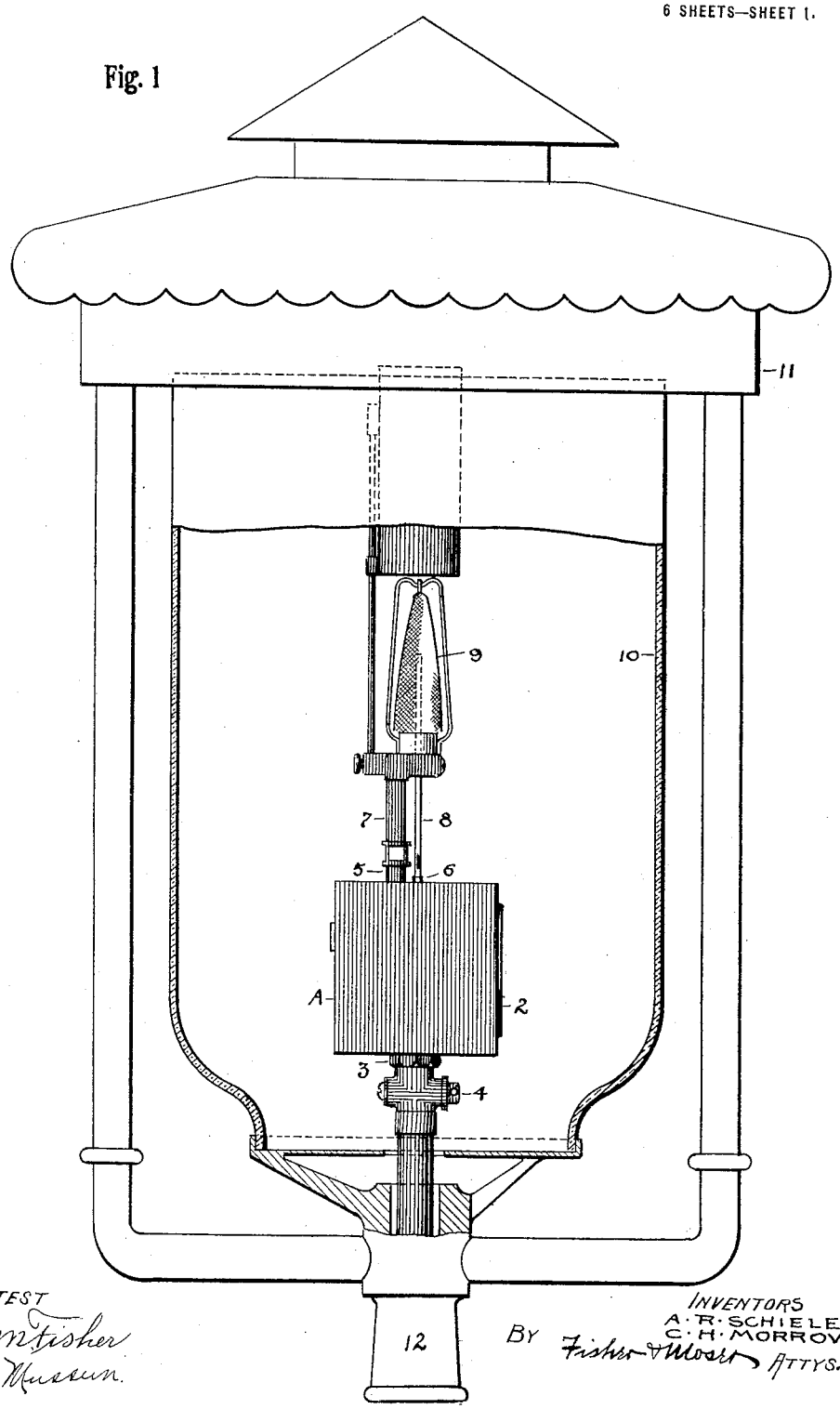

A. R. SCHIELE & C. H. MORROW.
GAS CONTROLLING APPARATUS.
APPLICATION FILED APR. 4, 1913.

1,161,415.

Patented Nov. 23, 1915.
6 SHEETS—SHEET 1.

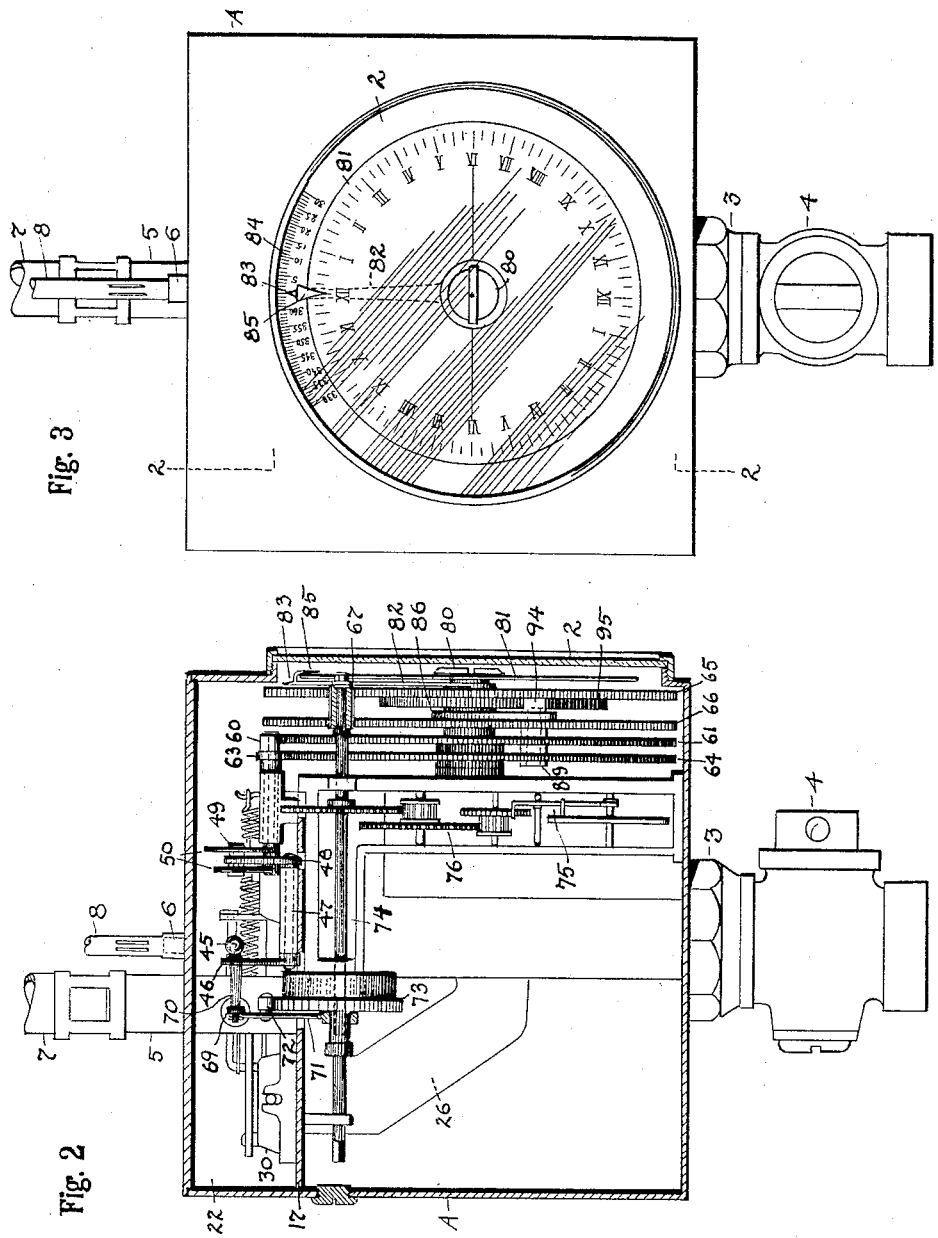

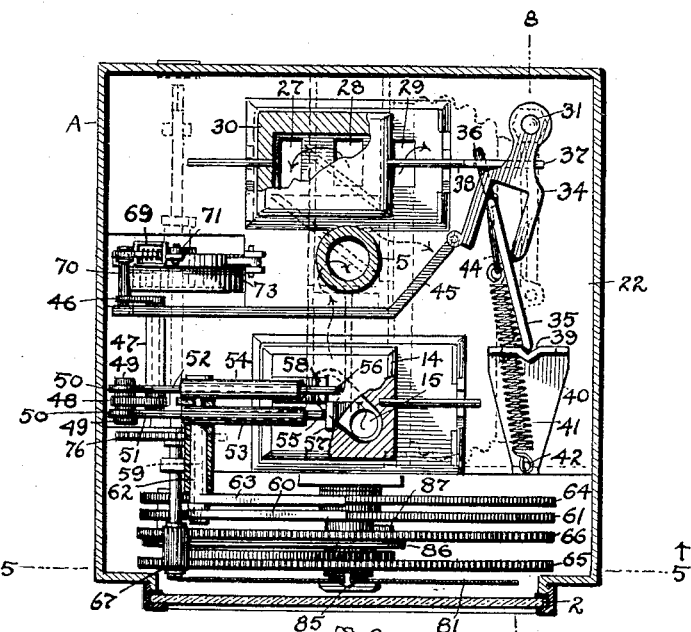

A. R. SCHIELE & C. H. MORROW.
GAS CONTROLLING APPARATUS.
APPLICATION FILED APR. 4, 1913.
1,161,415.
Patented Nov. 23, 1915.
6 SHEETS—SHEET 4.
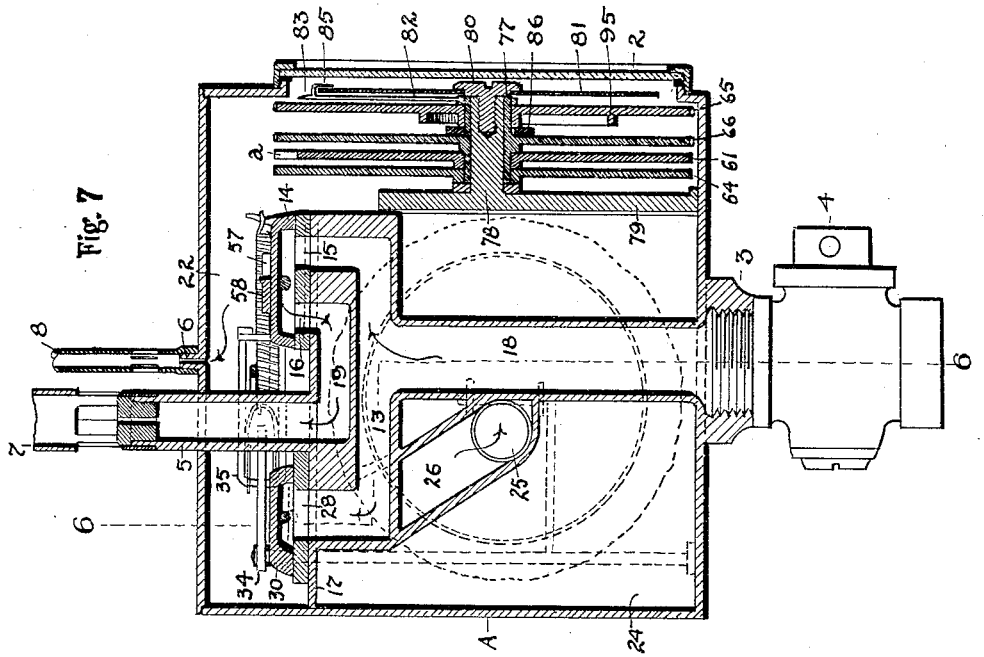
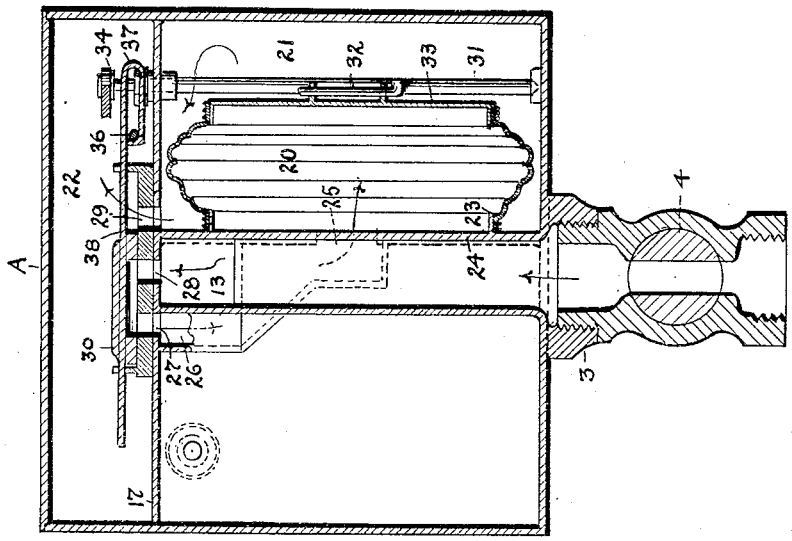
ATTEST
E. M. Fisher
J. Q. Museum.
INVENTORS
A. R. SCHIELE
C. H. MORROW
By Fisher &Moser ATTYS.

A. R. SCHIELE & C. H. MORROW.
GAS CONTROLLING APPARATUS.
APPLICATION FILED APR. 4, 1913.
1,161,415.
Patented Nov. 23, 1915.
6 SHEETS—SHEET 5.
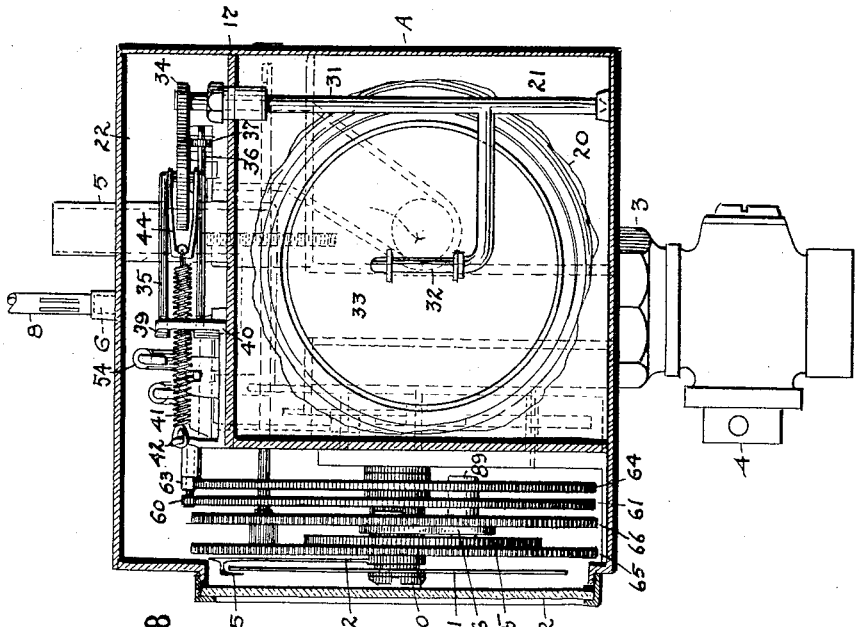
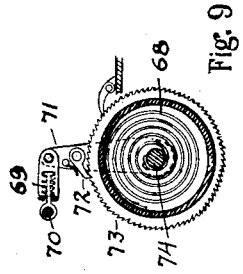
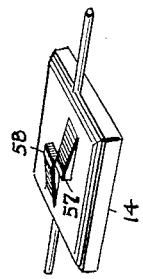
ATTEST
INVENTORS
A. R. SCHIELE
C. H. MORROW

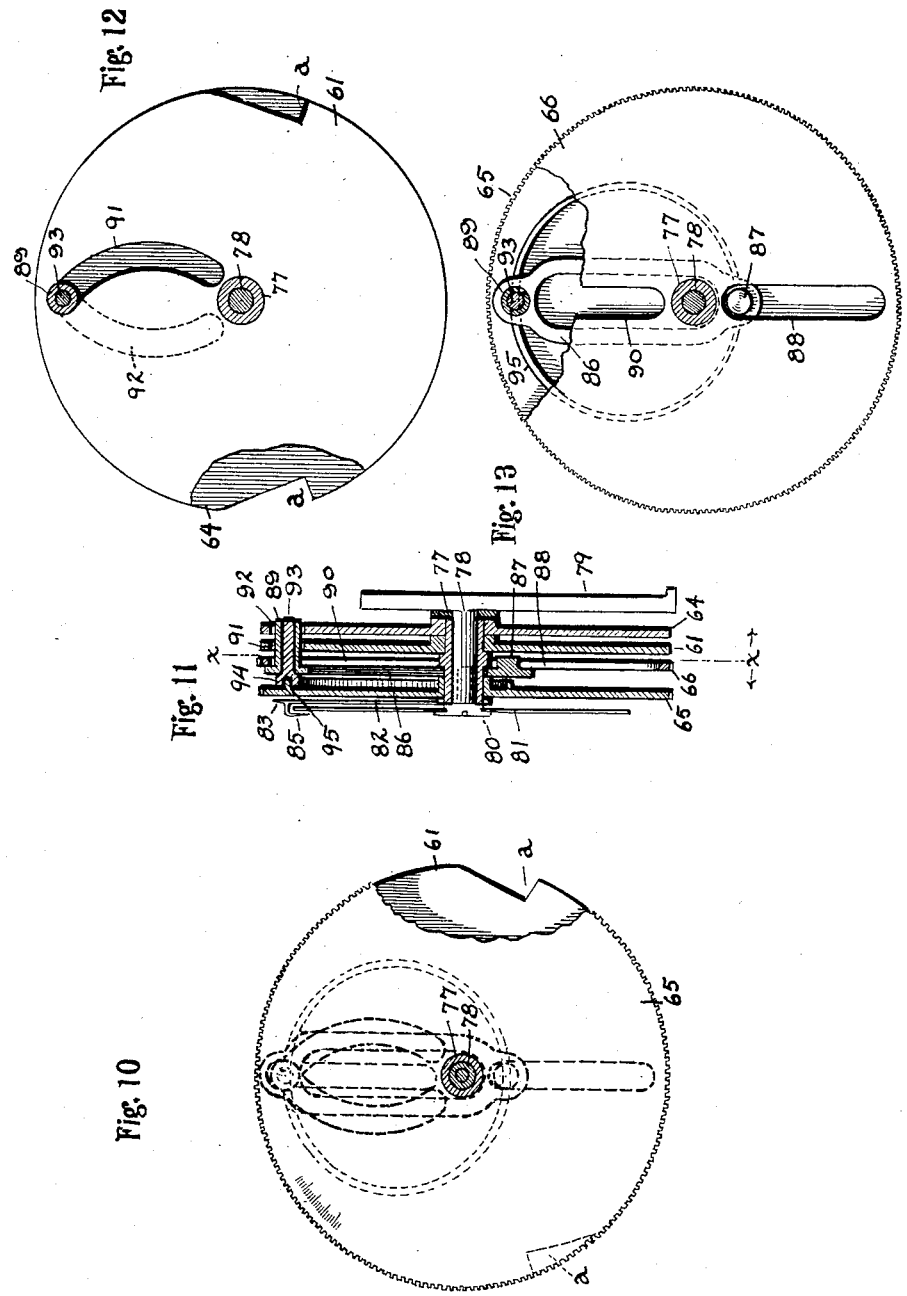

UNITED STATES PATENT OFFICE.

ARTHUR R. SCHIELE AND CLARENCE HERBERT MORROW, OF CLEVELAND, OHIO.

GAS-CONTROLLING APPARATUS.

1,161,415.      Specification of Letters Patent.      Patented Nov. 23, 1915.

Application filed April 4, 1913. Serial No. 758,791.

*To all whom it may concern:*

Be it known that we, ARTHUR R. SCHIELE and CLARENCE HERBERT MORROW, citizens of the United States, residing at Cleveland, in the county of Cuyahoga and State of Ohio, have invented certain new and useful Improvements in Gas-Controlling Apparatus, of which the following is a specification.

The invention comprises an automatic apparatus for controlling the flow of gas or other fluid under pressure, and the apparatus is of especial value and utility for street lighting purposes or wherever gas is used at intermittent intervals, substantially as herein shown and described and more particularly pointed out in the claims.

As applied to street lighting, the object of the invention is to provide an apparatus which will turn on and light the gas in each lamp at the approach of night, and then cut off the gas at daybreak, using the gas itself as the motive agent to operate the apparatus and employing a timing device to variably control the opening and closing of the gas supply valve to correspond to the changing alternations in the relative length of day and night which will take place each year.

In the accompanying drawings, Figure 1 is a side elevation and sectional view of a street lamp embodying our invention. Fig. 2 is an enlarged sectional view and side elevation of the apparatus without the lamp burner, this view being substantially on line 2—2, Fig. 3, and Fig. 3 is a front view of the apparatus showing the hour and day dials. Fig. 4 is a plan view and section on line 4—4, Fig. 5, and Fig. 5 is a front view with the casing in section and the hour dial removed, this view being taken on line 5—5, Fig. 4. Fig. 6 is a vertical section of the device on line 6—6, Fig. 7, and Fig. 7 is a central vertical section through the main gas passages at right angles to Fig. 6. Fig. 8 is a side elevation and sectional view substantially on line 8—8, Fig. 4. Fig. 9 is a detail view of the ratchet and power spring for the timing mechanism. Fig. 9ᵃ is a perspective view of the gas supply valve. Fig. 10 is a front view and Fig. 11 a sectional view of the gears and parts which control the opening and closing of the gas supply valve day and night in accordance with equinoctial changes of the year. The parts at the right of line *x—x*, Fig. 11 are shown by Fig. 12, and the parts at the left of the same line are shown in Fig. 13, portions being broken away to disclose other features.

The apparatus comprises a sealed box or chambered body A of any suitable form or design having a glass dial or window 2 at its front and a gas coupling 3 at its bottom. A plug-valve 4 to regulate the supply of gas from the main pipes is also shown. Outlet of the gas from box A is through the two pipes 5 and 6, respectively, at the top of the box, the larger pipe 5 having an air mixing tube and burner 7 of the Bunsen type connected therewith, and the small pipe 6 having a pilot-light tube 8 extending into the mantle 9 of the burner. The burner and pilot-light may be of any preferred form, and may be inclosed as usual by a lamp globe 10 seated within the housing 11 of a lamp post 12 or other support, see Fig. 1.

The pilot light burns constantly and therefore the flow of gas thereto must be uninterrupted, but the gas for burner 7 flows only for predetermined intervals of time, that is, during the night, and is cut off during the day by means of a slide valve 14 (Fig. 7) which is seated above two portions 15 and 16 in horizontal division wall 17. These ports communicate with the gas intake pipe 18 and the outlet passage 19, respectively. The opening and closing movements of valve 14 are momentary and occur only twice in twenty-four hours, and operation thereof is primarily by the bellows motor 20 which derives its power from the gas flowing through box A via the pilot light 8. Explaining further, the bellows is alternately inflated and deflated by alternately by-passing the gas into the bellows and into the chamber 21 containing the bellows and by permitting the gas from the bellows and chamber to escape under valve control to an upper chamber 22 within box A from which pilot light 8 receives its supply of gas.

Bellows 20 is of bulb-shape, the body being made of leather or other pliable material secured to the integral flange 23 forming part of the vertical division wall 24 comprising one of the walls of gas chamber 21 in box A, Fig. 6. An opening 25 in wall 24 affords communication with the interior of the bellows by way of an irregular passage 26 which leads to a port 27 in horizontal division wall 17 and which port when uncovered is open to upper chamber 22.

In fact there are three ports, 27, 28 and 29, in a row, the port 28 being open to the main gas intake pipe 18 by way of side passage 13, and the port 29 being open to chambers 21 and 22 when the slide valve 30 is in the position shown in Fig. 6 and over ports 27 and 28. The slide valve is recessed at its bottom to permit the gas to flow between middle port 28 and either of the other two ports dependent upon the position of the valve, and in Fig. 6 the parts are related to permit the gas to flow under pressure from intake pipe 18 to the interior of the bellows 20 to expand the same while the gas surrounding the bellows in chamber 21 is free to escape through port 29 into chamber 22 and to pilot light 8. Valve 30, when shifted to the right, opens port 27 to upper chamber 22 and brings ports 28 and 29 into communication to pass the gas under pressure from intake 18 into chamber 21 to compress the bellows 20, the gas within the bellows escaping into upper chamber 22 and to the pilot light through the uncovered port 27.

Valve 30 is reciprocated at the end of each reverse stroke of the bellows by means of a vertical rock shaft 31 located at one side of the bellows in chamber 21 and having an arm 32 pivotally connected to the cap end 33 of the bellows, Figs. 6 and 8. The upper end of shaft 31 extends into upper chamber 22 and is provided with a forked arm 34 (Figs. 4 and 8) which co-acts with a U-shaped oscillatory member 35 having an extension 36 engaged with the loop end 37 of the stem 38 of valve 30. Yoke member 36 has its two legs formed with knife-edged ends which are seated in V-shaped recesses 39 of a fixed bracket part 40, and a coiled spring 41 holds this member seated while permitting oscillatory movements thereof. This spring connects at one end with bracket lug 42 and extends through a slot 43 (Fig. 5) in bracket part 40 to connect at its other end with a link 44 attached to the vertical cross piece of the yoke member 35 which is engaged by one or the other of the arms of forked arm 34 in its oscillatory movements. In Fig. 5, the oscillatory member 35 and spring 41 are inclined relatively to each other but are brought into line and on a dead center when forked arm is moved to the right. The instant the dead center is overcome, spring 41 will, of its own accord, throw yoke member 35 to the extreme right and its extension 36 will thereby suddenly shift valve 30 to reverse the flow of gas to and from the bellows and its chamber 21. In the reverse movements of the parts, the rock shaft 31 and its forked arm carry member 35 back to the dead center and the same quick throw of valve 30 occurs in the reverse direction by pull of spring 41. The loop 37 of valve stem 38 permits the bellows motor to operate without immediate effect on valve 30 or until the dead center of movements of the parts is overcome. The oscillatory movement of forked arm 34 is also utilized to operate slide valve 14 which controls the gas supply to the main burner 7, but this valve is only shifted in one direction or the other at long intervals. The operating parts for this purpose comprise a connecting bar 45 pivotally united to forked arm 34 and to one crank arm 46 of a rock shaft which is supported in a bearing 47 at the top of horizontal division wall 17. A second rigid crank arm 48 on said rock shaft is provided with two oppositely-projecting crank pins 49 engaged with the looped ends 50 of two rods 51 and 52, respectively. These rods are reciprocably mounted in separate tilting carriers 53 and 54, and have right-angled ends 55 and 56 to engage the spurs or teeth 57 and 58 at the top of valve 14, providing one or the other of the carriers 53 and 54 is in a lowered position to effect such engagement. Normally, both carriers are tilted at an angle so that the right-angled ends of the reciprocable rods 51 and 52 cannot possibly engage the spurs or teeth on the valve, notwithstanding that the reciprocation of the said rods is constant owing to their connection with oscillatory arm 34. The uplifted position for each rod carrier is maintained by independent arms riding on the periphery of two disks 61 and 64; carrier 54 having a shaft 59 provided with a rigid arm 60 which rides upon the disk 61, and carrier 53 having a tubular shaft 62 sleeved upon shaft 59 and provided with a rigid arm 63 which rides upon the disk 64. Each disk has a single notch $a$ in its peripheral edge into which the engaging arm drops by gravity when the disk in its revolutions brings the notch opposite the arm. This relationship of parts is shown in Fig. 4 wherein arm 60 is in the notch $a$ and the end 55 of push rod 51 is in lowered position behind the spur or tooth 57 of slide valve 14, and therefore in position to push said valve 14 to the right upon a forward movement of the rod 51. The reverse movement of the valve 14 is effected when arm 63 drops into its notch in disk 64 and lowers the end 56 of the other reciprocable rod 52 into pulling engagement with the other spur or tooth 58. But such reverse movement of the valve does not immediately occur as the notch in disk 64 is at a different radial point relatively to the notch in disk 61. In fact there is a time when the two notches are diametrically opposite as occurs at the vernal and autumnal equinoxes. Rotation of the two disks in opposite direction changes the circumferential distance between the notches and the variable relationship of the notches is utilized to time the opening and closing of valve 14 to correspond to the changing alternations in the relative length of day and night throughout the year. The means to drive the disks comprises a pair of gear wheels 65 and 66 and a pinion 67, the shaft for the pinion being rotated by a convolute spring 68 maintained under constant tension. The power to wind the spring is derived from the bellows motor through forked arm 34, link 45, crank arm 46, a spring-cushioned connection 69 between crank pin 70 and an oscillatory lever 71 carrying a pawl 72, a ratchet wheel 73, and the spring-driven shaft 74 for pinion 67, see Figs. 2 and 9. The spring connection 69 prevents excessive winding of the main spring 68 and pinion 67 is frictionally and removably secured to shaft 74 by a nut to permit a changed setting of the gears and disks. Shaft 74 has an escapement device 75 connected therewith by a train of gears 76, and any suitable escapement mechanism may be used to regulate the revolutions of pinion 67 and the gear wheels 65 and 66.

In the present device gear wheel 65 has 365 teeth and gear 66 one tooth less, or 364, to produce a differential rotation therebetween. Gear wheel 65 and both the notched disks are rotatably mounted upon the hubs 77 of gear wheel 66 which in turn is rotatably supported by a stud 78 on bracket 79, see Fig. 7. A cap screw 80 at the outer end of the stud secures all four of these rotatable members in working relations, and a clock dial 81 is immovably fastened to this cap screw or to the stud 78. A clock finger 82 is attached to the outer hub 77 of gear wheel 66 and has a pointed end 83 adjacent the circle of graduations 84 on the outer face of wheel 65. The graduated marks on the wheel denote the days in the year, the successive days being indicated by the finger end 83 as the two gear wheels 65 and 66 revolve at slightly different speeds. A second pointer 85 on finger 82 extends over dial 81, and as this finger makes a complete circuit of the fixed dial once every twenty-four hours it indicates the hours of each day and night. The two notched disks also make one revolution every twenty-four hours, being driven by gear wheel 66 and a slotted lever 86 which is arranged at an intermediate point between the two gear wheels. This lever has a short stud 87 at one end to slide in a straight radial slot 88 in gear wheel 66 and is also provided with a longer stud 89 at its other end to extend through a second straight radial slot 90 in the same gear wheel 66 and also through the curved cam slots 91 and 92 in disks 61 and 64, respectively. The curved cam slots are reversely related and arranged equally distant from the median line of the lever 86 and the radial slots 88 and 89 in gear wheel 66, so that a movement of stud 89 on a straight line either away from or toward the disk axis will effect a reverse rotation of the notched disks relatively to each other while both disks are being jointly rotated in the same direction by gear wheel 66 and lever 86.

A reciprocable movement of lever 86 is obtained by utilizing the differential rotative movements of the two gear wheels 65 and 66. Thus, a pin 93 is rotatably seated within stud 89 of lever 86 and a slotted head 94 for this pin slidably engages an integral flange 95 on the inside face of gear wheel 65. This flange is in the form of a circle arranged eccentric to the axis of the gear wheels, and when one gear wheel has advanced or made one-half of a revolution more than the other gear wheel the lever 86 has made one stroke, the return stroke occurring when said gear wheel completes its revolution relatively to the other. One stroke of the lever rotates the two disks a given distance in opposite directions and the other stroke produces a reverse movement of the disks, thereby changing the position of the two notches a in the disks relatively to each other to variably control the opening and closing of valve 14 to correspond to the changing alternations in the relative length of day and night throughout the year.

A key may be used to start the device by turning the ratchet shaft 96 or the initial movement of the bellows motor will wind the spring sufficiently to start the timing mechanism when the plug valve 4 is opened and the pilot light ignited. Thereafter the device will work automatically until the gas pressure from the main pipe is cut off,—continuous operations being entirely dependent upon the bellows motor which is driven by the gas itself as herein described. The yielding connection 69 between the ratchet mechanism and the motor permits repeated movements of the parts without injurious effects.

What we claim is:

1. In a gas controlling apparatus, a chambered receptacle and a bellows motor therein, and a gas controlling valve for said motor having operating connections therewith, in combination with a gas supply connection and valve therefor, means to operate said supply valve through said motor, and tilting members and rotatable devices to hold said means out of operating engagement with said supply valve for predetermined intervals.

2. An apparatus for controlling the flow of gas under pressure comprising a gas receptacle having a gas inlet and a main gas outlet and an auxiliary gas exit, in combination with a valve for said main gas outlet, a double-acting motor for said valve deriving its power from the gas flowing through said receptacle via said auxiliary gas exit and having intake and exhaust ports and a single valve to control the flow of gas through said ports and to and from said motor to said auxiliary gas exit, and operating connections between said motor and both valves to produce conjoint action thereof at intervals.

3. In an apparatus for controlling the flow of gas under pressure, a gas receptacle having a gas inlet and separate main and subordinate gas outlets, in combination with a valve for said main gas outlet, a double-acting gas motor and intermittent-operating devices for said valve operated thereby, a single valve to control both the inflow and outflow of gas to and from said pressure motor and to said subordinate gas outlet and intermittent operating devices for said single valve connection with said motor.

4. In an apparatus for controlling the flow of gas under pressure, in combination, a gas receptacle having a gas inlet and main and secondary gas outlets, separate slide valves for said main and secondary gas outlets, a motor adapted to be operated by the gas flowing through said receptacle, motor connections to reciprocate both said valves concurrently, and means to regulate the concurrent action of said valves.

5. In an apparatus for controlling the flow of gas in combination, a chambered receptacle having a motor chamber and a gas intake connection and separate burner and pilot light connections, a slide valve to control the flow of gas to said burner connection, a bellows motor, operating devices for said valve connected with said motor, a timing device to bring said operating devices into action at intermittent intervals, a single slide valve to control both the intake and the exhaust for the motor chamber and the pilot light connection and being adapted to reverse the flow of gas for the motor.

6. In a gas controlling apparatus, in combination, a gas burner and a pilot light therefor, a double-acting motor having a conjoint gas connection, a single slide valve to control the intake and exhaust of gas for said motor and to maintain a constant supply of gas under pressure for said pilot light, coöperating connections for said motor and valve, a slide valve for said burner having oscillatory operating connections with said motor, and mechanism to variably control the opening and closing of said burner valve for predetermined intervals of time.

7. In a gas regulator, a receptacle having gas supply and discharge connections and separate gas chambers, a double-acting motor in one of said chambers and intake and exhaust ports therefor, a slide valve to control the flow of gas through said connections, a single slide valve to control both the intake and exhaust port for said motor chamber, and said motor having operating instrumentalities for both said valves, in combination with a timing device to variably control the opening of the valve for the gas-supply and discharge connections to correspond to the changing alternations in the relative length of day and night throughout the year.

8. In a gas controlling apparatus, a receptacle having a gas inlet and a main gas outlet and an auxiliary gas outlet and separate gas chambers, a bellows motor in one chamber said motor chamber having inlet and outlet ports in open communication with said auxiliary outlet, a slide valve to reverse the flow of gas through said ports to said chamber and maintain constant open communication for the auxiliary outlet with said motor chamber, a valve to control the main gas outlet for the receptacle, and actuating devices for said valves operated by said motor, in combination with regulating means to produce an intermittent movement at long intervals of the said gas outlet valve concurrently with the movement of the reversing valve.

9. In a gas controlling apparatus, a gas supply connection and a motor deriving its power from the gas flowing therethrough, a gas controlling valve for said motor, an oscillatory shaft having a yoked arm, an oscillatory yoke member engaged with said arm and said valve, and a single spring under constant tension and connected at its ends to oscillate and to throw said members over a dead center.

10. In a gas controlling apparatus, a gas supply connection and a valve therefor, a gas operated motor open to said supply connection and a gas controlling valve for said motor, and a set of tilting carriers having reciprocable pawls therein to engage said gas supply valve, oscillatory instrumentalities connected with said motor and having a limited free play connection with said gas controlling valve.

11. In a gas controlling apparatus, a gas supply connection having a slide valve, devices to engage and operate said valve, means to provide timed operations of said device, a pilot light, a double-acting gas-driven motor to operate said timing means having a gas outlet communicating with said pilot light, reversible gas-controlling valve for said motor and pilot light gas outlet, and operating instrumentalities for both valves connected to said motor.

12. In a gas controlling apparatus, a gas supply connection and a controlling valve therefor, actuating devices for said valve, and means to produce intermittent actuation of said devices, in combination with a gas driven motor, a slide valve for said motor, an oscillatory yoke having a limited free play operating connection with said motor controlling valve, a forked oscillatory arm, and a tension spring linked to oscillate with said yoke, said arm having operating connection with said motor.

13. In a gas controlling apparatus, a bellows motor, a valve therefor, a stem for said valve having a loop, and oscillatory means to operate said valve comprising a rock shaft engaged with said motor, a forked arm on said shaft, a yoke member having an extension engaged within said valve stem loop, and a tension spring connected with the stretched longitudinally within the yoke member to coact with said arm in throwing the said member past a dead center.

14. In a gas-controlling apparatus, a gas supply connection having a slide valve, a motor, oscillatory connections and a pair of reciprocable valve engaging rods between said valve and motor, tilting carriers slidably supporting said rods, rotatable cam disks to tilt said carriers and cause alternate engagement and disengagement of said rods and valve, and means to rotate said cam disks.

15. In a gas controlling apparatus, a slide valve to control the gas supply having inclined teeth reversely related thereon, a motor, oscillatory members operated by said motor, reciprocable rods pivotally engaged with said members and having ends to engage said valve teeth, tubular tilting carriers to slidably support said rods, cam disks to tilt said supports, and gears for said cams having operating connections with said motor.

16. In a gas controlling apparatus, in combination a gas driven motor having a controlling valve to produce constant working thereof under maintained pressure, a gas supply connection having a valve, and devices to open and close said valve at intervals comprising a pair of cam disks, a pair of gears to produce a differential rotation of said disks, one of said gears having a cam on one face, the other gear and the disk having slots and a lever having a stud extending through said slots, a pin carried by said stud engaged with said gear cam, and drive connections for said gears operated by said motor.

17. In a gas controlling apparatus, a gas driven motor having a reciprocable valve and means to operate the same to produce constant working of said motor, in combination with a gas supply valve and means to alternately open and close said supply valve at intervals comprising a set of slotted cam disks differentially-rotatable gears, a lever having a stud engaged with said disks and a cam and pin to produce a variable joint rotation of said disks, and spring power connections for said gears having winding devices operated by said motor.

18. In a gas controlling apparatus, in combination a gas supply valve, a motor mechanism operated by said motor to open and close said valve, controlling devices for timing the operation of said mechanism comprising a pair of rotatable gears and a pair of slotted cam disks and a lever mounted to rotate on a common axis, a circular flange on the face of one gear, and a pin rotatably mounted on said lever and extending through the slotted disks, a power spring for said gears and disks, a winding device for said spring, and a yielding connection for said winding device to permit repeated movements of the parts without injurious effect.

In testimony whereof we affix or signatures in presence of two witnesses.

ARTHUR R. SCHIELE.
CLARENCE HERBERT MORROW.

Witnesses:
E. M. FISHER,
R. B. MOSER.